United States Patent [19]

Andersson et al.

[11] Patent Number: 5,799,454
[45] Date of Patent: Sep. 1, 1998

[54] HEAT INSULATING OUTER WALL FOR A BUILDING

[75] Inventors: Kurt Allan Andersson, Oxie; Tage Carlsson, Kristianstad, both of Sweden

[73] Assignee: Skanska Teknik AB, Malmo, Sweden

[21] Appl. No.: 765,305
[22] PCT Filed: Jun. 28, 1994
[86] PCT No.: PCT/SE94/00640
§ 371 Date: Jan. 30, 1997
§ 102(e) Date: Jan. 30, 1997
[87] PCT Pub. No.: WO96/00823
PCT Pub. Date: Jan. 11, 1996
[51] Int. Cl.⁶ .................................................. E04B 1/70
[52] U.S. Cl. ............................. 52/302.3; 165/56; 454/271
[58] Field of Search ............................... 52/302.3; 165/56, 165/53; 454/270, 271

[56] References Cited

FOREIGN PATENT DOCUMENTS

| | | |
|---|---|---|
| 2 009 002 | 11/1971 | Germany . |
| 3 530 884 | 4/1986 | Germany . |
| 403 640 | 8/1978 | Sweden . |
| 441 535 | 10/1985 | Sweden . |
| 460 731 | 11/1989 | Sweden . |

Primary Examiner—Christopher Kent
Assistant Examiner—Yvonne Horton-Richardson
Attorney, Agent, or Firm—Young & Thompson

[57] ABSTRACT

A heat-insulating outer wall for a building includes an inner air gap (7) with a partitioning wall (12) which separates the inner air gap into a first part (7a) and a second part (7b), which at the top is equipped with an outlet opening (11). The second part (7b) is equipped at the bottom with a heater (13). Airflow-regulator (15) is positioned in suitable places in the wall in order to limit the airflow in the case of large air pressure differences.

15 Claims, 3 Drawing Sheets

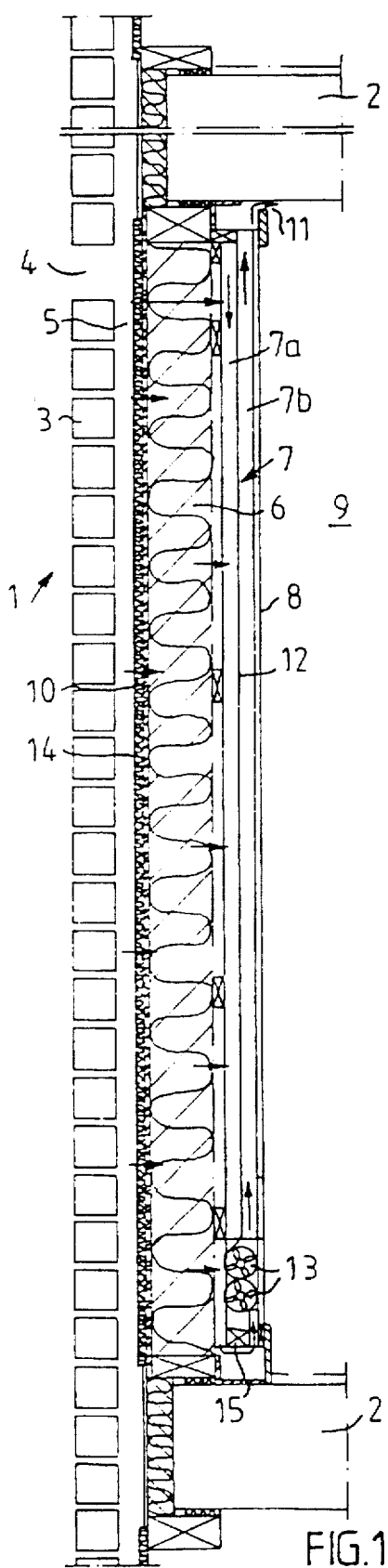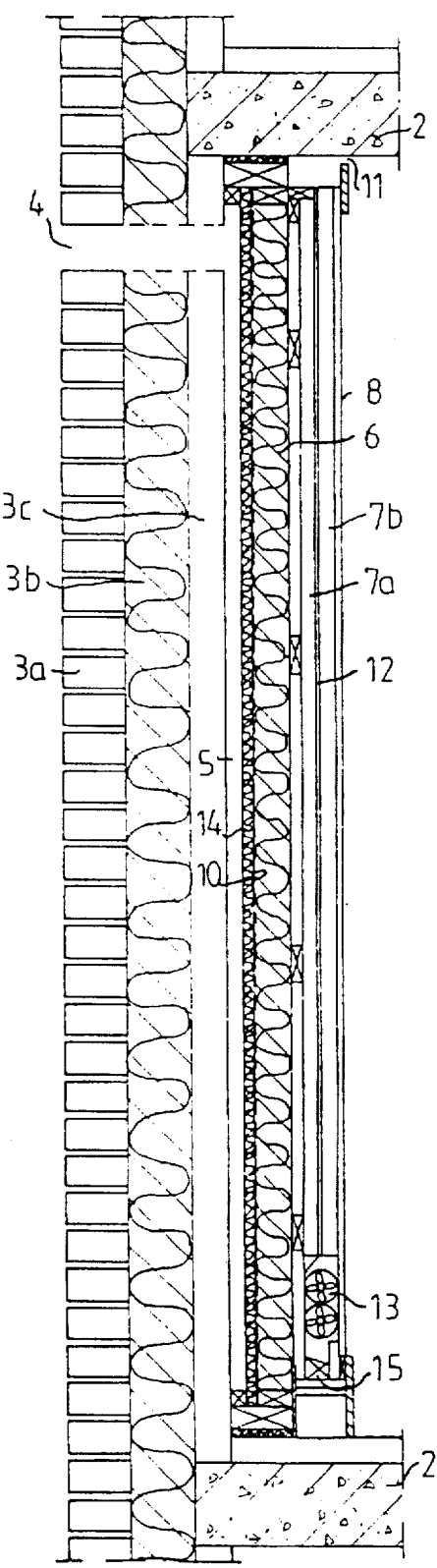

HEAT INSULATING OUTER WALL FOR A BUILDING

The invention concerns a heat insulating outer wall for a building.

The outer walls in buildings shall function as parts of a climatic shell of the building, and furthermore in certain cases they shall also have a load-supporting function. In recent years the heat insulating capacity has had a continuously increasing importance, and an increase of the heat insulating capacity has taken place through an increase in the thickness of the insulating layer in the wall. This method can, however, not always be used, especially when it concerns internal supplementary insulation in existing buildings, as the humidity and heat balance in the wall can be impaired, and furthermore, the increase in the thickness of the wall causes the floor area to be reduced.

It has earlier been suggested that in order to counteract heat transmission through the walls, a stream of air should be routed in from outside through the walls, so-called dynamic insulation.

An outer wall of the type mentioned in the introduction is described in our earlier patent application PCT/SE93/00569. Such a wall fulfills its function in a perfectly satisfactory manner under most conditions. It has, however, become apparent that such a wall does not function in a completely satisfactory manner at low outside temperatures in the region of −15° to −30° C.

The object of the invention is to achieve a heat insulating outer wall, which has a completely satisfactory function even at very low outside temperatures without any deterioration in its characteristics in other temperature regions. In that connection the intention is that the wall according to the invention shall have very good insulating characteristics at the same time as it is used for ventilation of the interior of the building as well as for filtering and preheating of the air passing through, so that the ventilation air flowing into the building is brought to a proper temperature and is free from particles which can be harmful, for example for people with allergies. This is achieved by the wall being designed with the distinctive features which are mentioned in the characterizing part of claim 1.

The invention will now be described more closely with reference to the attached drawings, which show different embodiments of the wall according to the invention, and in which:

FIG. 1 shows a schematic, vertical cross-section through a wall according to a first embodiment of the invention, intended for new buildings, FIG. 2 shows a schematic, vertical cross-section through a wall according to a second embodiment of the invention, intended for use with internal supplementary insulation in existing buildings, FIG. 3 is a partially sectioned perspective view of the wall according to FIG. 1, FIG. 4 shows a horizontal cross-section through the wall according to FIGS. 1 and 3, FIG. 5 shows a schematic section through a flow-regulating means for use in an outer wall according to the invention, and FIG. 6 is a schematic section through the lower part of the wall according to claim 1 and shows the positioning of the two flow-regulating means according to FIG. 5.

FIG. 1 shows a cross-section through an outer wall 1, which is intended for a building, of which for the rest only parts of two structural floors 2 are shown. The outer wall 1 comprises an outer cladding layer 3, which forms the exterior of the wall and in FIG. 1 is shown as a brick wall. The outer cladding layer 3 can, however, alternatively be made of other suitable materials, such as concrete, different sorts of sheeting or wood paneling. The outer cladding layer 3 is furthermore equipped with at least one inlet opening 4, which can be equipped with a grating or an insect net (not shown).

On the innermost side of the outer cladding layer 3 is an outer air gap 5, which covers substantially the whole surface of the outer wall 1. On the innermost side of the outer air gap 5 is an insulating layer 6, which forms the principal insulation in outer wall 1 and preferably is made from mineral wool. On the innermost side of the insulation layer 6 is an inner air gap 7, which is divided into a first part 7a and a second part 7b, as will be described more closely below. On the innermost side of the inner air gap 7 is an inner cladding layer 8, which forms the interior of wall 1 and delimits the wall from the interior 9 of the building.

Furthermore, there is a distribution layer 10, which in the embodiment shown in FIG. 1 is arranged on the outer side of the insulating layer 6 and in contact with it. The distribution layer 10 is made of a material which is in principle impermeable for air, such as foil and is equipped with a large number of very small perforations, which are distributed over the whole of the surface of the distribution layer 10. These perforations are so distributed that the airflow through the insulating layer 6 is distributed in principle equally over the whole surface of the insulating layer 6.

The inner cladding layer 8 is an airtight layer, which has sealed connections with the lower structural floor 2 and at its upper end is equipped with at least one outlet opening 11 for admitting air into the interior 9 of the building. Outlet opening 11 can, in this connection, as shown on the drawings, be shaped as a narrow slot in contact with the ceiling in the space 9.

As shown in FIG. 1, the inner air gap 7 is divided into a first part 7a and a second part 7b by means of a partitioning wall 12. Partitioning wall 12 is formed from a thin, heat-conducting material, such as sheet metal, foil or the like, and at the upper part of the wall is shaped in such a manner that the first part 7a of the inner air gap is airtight at the top thereof. Contrary to this, the base of partitioning wall 12 finishes at a distance from the lower end of the outer wall 1, so that there is communication between the first part 7a and the second part 7b at the base. The second part 7b of the inner air gap 7 is open both at the top and at the base, so that the incoming air can flow downwards in the first part 7a and subsequently stream across to the second part 7b and then flow up through this to the outlet opening 11, where the air flows into the interior 9 of the building.

Accordingly, the air flows into inlet opening 4 and is distributed in the outer air gap 5, and flows with a very low speed through distribution layer 10 and insulating layer 6, and in into the first part 7a of the inner air gap 7. The air is collected in the first part 7a and flows downwardly and past the lower end of the partitioning wall 12 and up through the second part 7b of the inner air gap 7, and out through outlet opening 11. During its passage through the wall in this manner the air is warmed up by the heat which flows out from the interior 9 of the building through the wall.

Heating means 13 are arranged in the lower part of the second part 7b of the inner air gap 7 in order to ensure that even at very low outside temperatures, down to −15° to −30° C. or lower, the inflowing air shall stream upwards through the second part 7b of the inner air gap 7. This heating means can be made from radiators for water-transported heat, electric radiators or some other suitable type of heating means. The heating means can be controlled in combination with other heating means for regulating the temperature in the interior 9 of the building. Because the partitioning wall 12 is made of heat-conducting material, heating of the air will also take place in the first part 7a of the inner air gap 7.

The function of the outer wall 1 according to FIG. 1 has in principle already been described above, but it should be observed that its function requires that the interior 9 of the building has an underpressure, so that there is an airflow through the wall. The arrangements for producing this are not included in the invention and are therefore not shown in the drawings.

FIG. 1 further shows a surface layer 14, which is placed in the outer air gap 5 in contact with the distribution layer 10. Surface layer 14 has in this respect the task of separating large particles out of the incoming air, so that these particles will not block the small perforations in the distribution layer 10. Alternatively, the distribution layer 10 can instead be arranged on the innermost side of the insulating layer 6.

As is evident from the above, outer wall 1 according to FIG. 1 fulfills on the one hand the conventional functions as a part of the climatic shell of the building, on the other hand the further function of forming an extremely effective filter for the ventilation air for the interior 9 of the building, wherein the wall at the same time has improved heat insulating capacity because the ventilation air supplied through the wall takes up at least a part of the heat which otherwise would have been lost to the surroundings, whereby at the same time the incoming air is brought to a proper temperature and is conveyed to the room in a noiseless and draughtfree manner.

FIG. 2 shows an outer wall 1 which has in principle the same construction as the outer wall 1 according to FIG. 1. Outer wall 1 according to FIG. 2 consists, however, of an outer wall in an existing building with an internal supplementary insulation according to the invention. Parts, which have counterparts in FIG. 1, have been accorded the same reference numbers in FIG. 2, and the function of the wall according to FIG. 2 is the same as of the wall according to FIG. 1. The principal difference is that the outer cladding layer is made of an outer layer 3a, in this case a brick wall, an insulating layer 3b and an inner layer 3c, which forms the inner side of the existing wall, which has been complemented in accordance with the invention.

Figure 3:
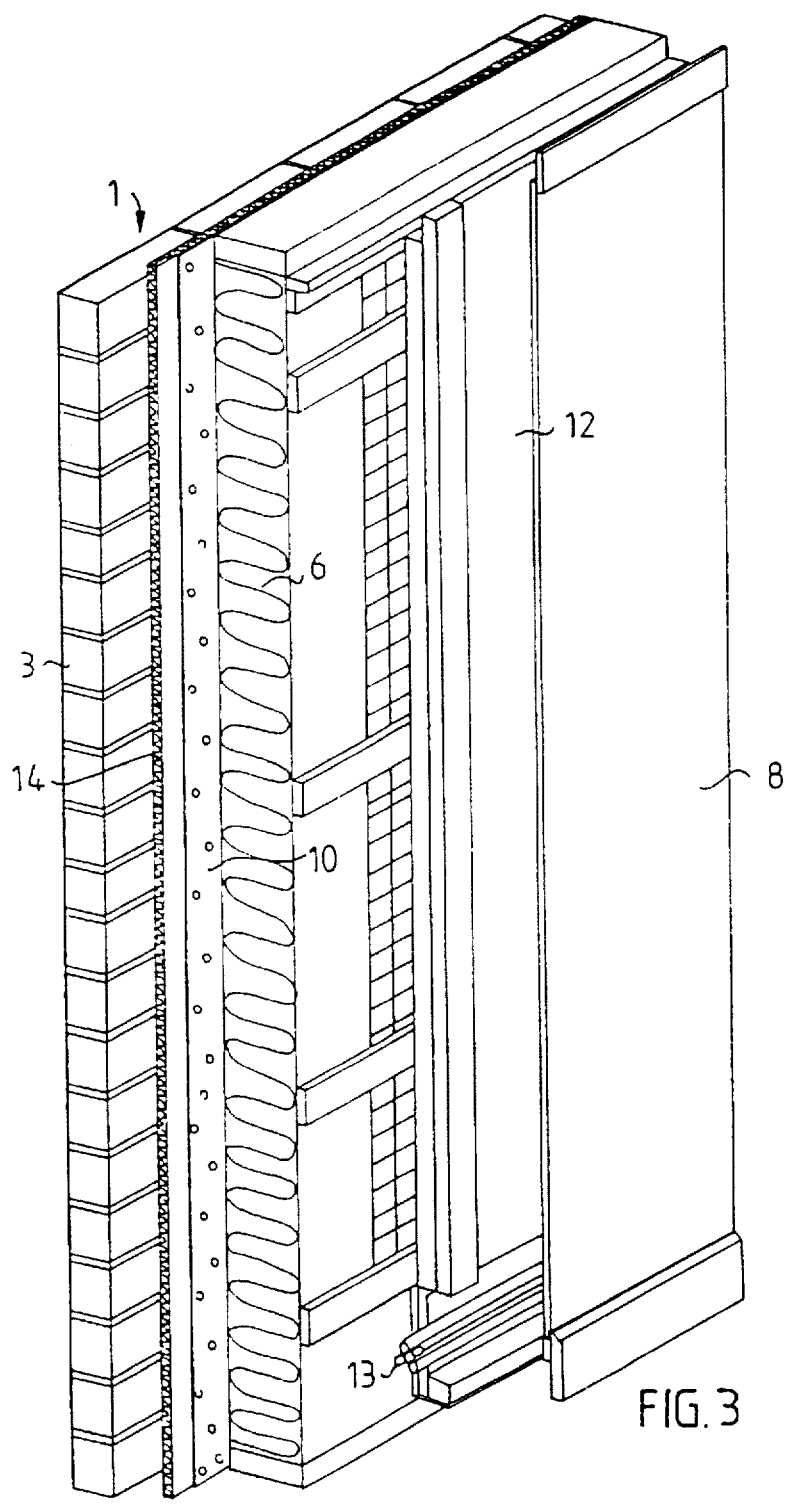
FIG. 3 shows a partially sectioned perspective view of the outer wall 1 in the embodiment which is shown in FIG. 1.
Figure 4:
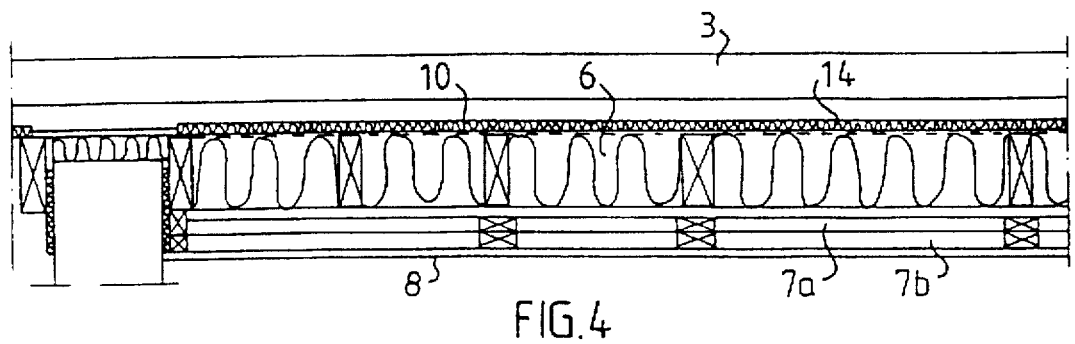
FIG. 4 shows a horizontal cross section through the outer wall 1 according to FIG. 1.
Figure 5:
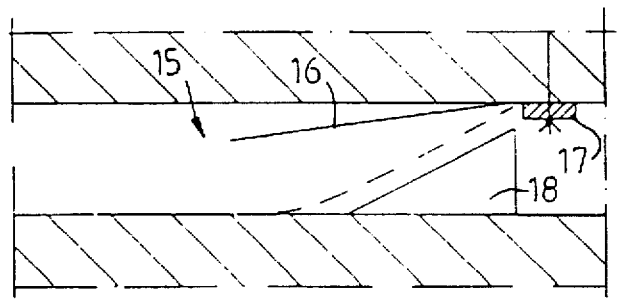

FIG. 5 shows a flow-regulating means 15, which can be placed somewhere in the airflow path from the inlet opening 4 to the outlet opening 11, in order to limit the flow and in this manner the flow speed of the air. Flow-regulating means 15 comprises a flap or tongue 16 of thin, resilient material, and this tongue is mounted in such a fashion that one end of it is held fast by means of a retaining means 17, while its other end is free. A support 18 is arranged to prevent tongue 16 being overloaded in the closed position.

Figure 6:
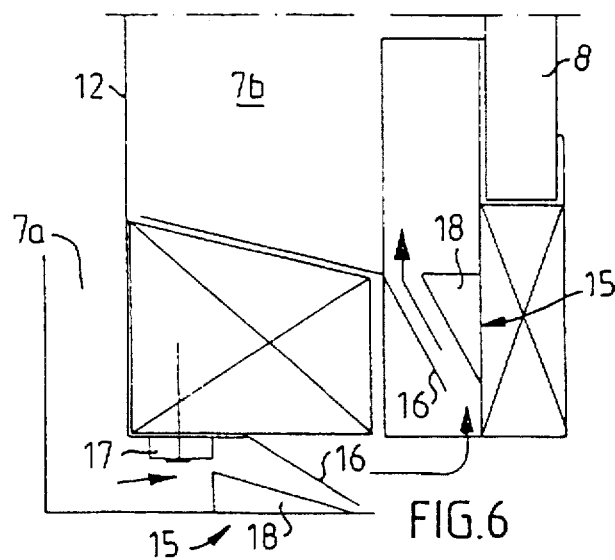

FIG. 6 shows at the right a vertically placed flow-regulating means 15. This forms a storm-safety device, that is to say, it prevents too high an airflow through the wall. Tongue 16 is held by its own weight in the position shown. When the speed of flow increases, the pressure-drop across tongue 16 will increase, and at a certain value the pressure difference is sufficient to overcome the weight of tongue 16. Then tongue 16 will be bent to the closed position, which is shown with a dashed line in FIG. 5. This means that by suitable dimensioning of tongue 16, it is possible to determine the speed of flow at which the tongue 16 will close down the flow.

At the bottom in FIG. 6 is shown a flow-regulating means 15, which functions as a non-return valve. This flow-regulating means is placed horizontally, and tongue 16 is so dimensioned that because of its own weight it lies against the support 18 when the pressure difference is zero. This corresponds to the position shown with a dashed line in FIG. 5. With an underpressure in the interior 9 of the building, tongue 16 will be lifted from support 18 and will allow an airflow which is proportional to the pressure difference. In the case of possible pressure impulses in the opposing direction, tongue 16 will fall down against support 18 and in this way prevent airflow in the direction from the interior 9 of the building.

Placing of the flow-regulating means 15 at the bottom of the wall, where the heating means 13 are placed, means that these means can be easily reached for cleaning and service behind a dismountable skirting board (not shown).

The above described embodiments of the outer wall according to the invention can naturally be modified in different ways within the frame of the invention. For example, the insulating layer 6 can be made from so-called loose wool, that is, of a mineral wool which is made of loose fibers without any binding agent. This means that it is possible to avoid problems with possible releasing of traces of binding agent from insulating layer 6. With the use of loose wool, it is, however, a requirement that on both sides of insulating layer 6 there is some form of supporting layer (not shown), which contributes to the insulating layer 6 retaining its correct shape.

We claim:

1. A heat insulating outer wall (1) for a building, in which the wall comprises an outer cladding layer (3), an outer air gap (5), which is in communication with outside air through at least one inlet opening (4) in the outer cladding layer (3), an insulating layer (6) made of a material which is air-permeable and which filters particles out of the passing outside air, (5), an inner air gap (7), and an inner cladding layer (8), with at least one outlet opening (11) at its top for forming a connection between the inner air gap (7) and an interior (9) of the building, wherein the inner air gap (7) comprises a partitioning wall (12), which divides the inner air gap (7) into a first part (7a), which is positioned nearest to the insulating layer (6) and is closed at its top, and a second part (7b), which is placed nearest the inner cladding layer (8) and at its base is in communication with a base of the first part (7a), a top of said second part (7b) being equipped with the outlet opening (11), wherein the second part (7b) of the inner air gap (7) is equipped at its base with a heating means (13).

2. The wall according to claim 1, wherein the insulating layer (6) comprises mineral wool in the form of sheets.

3. The wall according to claim 1, wherein the insulating layer (6) is made of mineral wool in the form of loose wool, and wherein a supporting layer is arranged on each side of the insulating layer (6) as a support for the loose wool.

4. The wall according to claim 1, further comprising a distribution layer (10) on at least one side of the insulating layer (6), said distribution layer (10) being made of an air-impermeable material and has a large number of evenly distributed perforations.

5. The wall according to claim 4, wherein the distribution layer (10) is made of a foil with holes for air-permeability.

6. The wall according to claim 1, further comprising a surface layer (14) outside the distribution layer (10) for separating large particles out of air flowing therethrough.

7. The wall according to claim 1, further comprising a storm-safety means (15) in the wall (1) for limiting airflow speed when a pressure difference between the outside air and the interior (9) of the building is large.

8. The wall according to claim 1, further comprising a non-return valve (15) in the wall (1) for preventing airflow from the interior (9) of the building towards the outside air.

9. The wall according to claim 1, wherein said first part (7a) is positioned next to said insulating layer (6) so as to receive air from said insulating layer (6) over substantially the entire surface of said first part (7a).

10. The wall according to claim 1, wherein said inlet opening, said outlet opening, and said insulating layer are constructed and arranged to provide ventilating air to an interior of the building.

11. A wall system comprising:

an outer cladding layer with an air inlet opening;

an outer air gap next to said outer cladding layer in communication with said air inlet opening;

a distribution layer next to said outer air gap comprising an air impermeable material with a plurality of air holes spaced over an entirety of its surface;

an air permeable insulating layer next to said distribution layer for receiving air from said air holes of said distribution layer over an entirety of a surface of said insulating layer;

a first air gap positioned next to said insulating layer so as to receive air from said insulating layer over substantially an entire surfaces of said first air gap; and a second air gap spaced from said first air gap by a divider, said divider separating said first air gap from said second air gap except at one end, said one end housing a heater for heating air from said first air gap and providing the heated air to said second air gap.

12. The wall system of claim 11, wherein said divider is heat conductive.

13. The wall system of claim 11, wherein said second air gap comprises a plurality of vents for venting the heated air.

14. The wall system of claim 13, wherein said vents are at a top of said second air gap for venting the rising heated air.

15. The wall system of claim 11, further comprising an air permeable surface layer comprising an air filter next to said distribution layer.

* * * * *